(12) United States Patent
Wang

(10) Patent No.: US 12,722,369 B2
(45) Date of Patent: Sep. 1, 2026

(54) COMPOSITE SHEET, METHOD FOR MANUFACTURING THE SAME, AND COMPOSITE STRUCTURE

(71) Applicant: Chaei Hsin Enterprise Co., Ltd., Taichung City (TW)

(72) Inventor: Shui-Mu Wang, Taichung City (TW)

(73) Assignee: Chaei Hsin Enterprise Co., Ltd., Taichung City (TW)

( * ) Notice: Subject to any disclaimer, the term of this patent is extended or adjusted under 35 U.S.C. 154(b) by 210 days.

(21) Appl. No.: 18/639,980

(22) Filed: Apr. 19, 2024

(65) Prior Publication Data

US 2025/0010571 A1 Jan. 9, 2025

(30) Foreign Application Priority Data

Jul. 5, 2023 (TW) ................................ 112125104

(51) Int. Cl.
*B32B 38/18* (2006.01)
*B32B 3/30* (2006.01)
(Continued)

(52) U.S. Cl.
CPC ............ *B32B 38/1866* (2013.01); *B32B 3/30* (2013.01); *B32B 5/028* (2013.01); *B32B 7/022* (2019.01);
(Continued)

(58) Field of Classification Search
CPC ......... Y10T 156/1028; Y10T 156/1039; B32B 38/1866; B32B 38/06; B32B 15/20; B32B 15/085; B32B 15/09; B32B 15/095; B32B 15/08; B32B 27/12; B32B 27/32; B32B 27/36; B32B 27/40; B32B 37/06;
(Continued)

(56) References Cited

U.S. PATENT DOCUMENTS

2005/0064652 A1* 3/2005 Shapira .................. H05K 3/041
438/232
2005/0112330 A1* 5/2005 Suzuki .............. B29C 45/14811
428/156

(Continued)

FOREIGN PATENT DOCUMENTS

CN 101376317 A 3/2009
CN 110461596 B 1/2022

(Continued)

*Primary Examiner* — John L Goff, II
(74) *Attorney, Agent, or Firm* — Winston Hsu

(57) ABSTRACT

A composite sheet includes a first resin layer, a metal layer and a second resin layer. The first resin layer includes a first surface, a second surface opposite to the first surface, and a plurality of first resin protrusions protruding from the second surface. The metal layer is capable of reflecting visible light and includes a third surface, a fourth surface opposite to the third surface, and a plurality of metal protrusions protruding from the fourth surface. The metal layer is fixed on the second surface through the third surface. The plurality of metal protrusions correspond to the plurality of first resin protrusions. The second resin layer includes a fifth surface, a sixth surface opposite to the fifth surface, and a plurality of second resin protrusions protruding from the sixth surface. The plurality of second resin protrusions correspond to the plurality of metal protrusions.

1 Claim, 10 Drawing Sheets

(51) Int. Cl.

| | |
|---|---|
| ***B32B 5/02*** | (2006.01) |
| ***B32B 7/022*** | (2019.01) |
| ***B32B 15/085*** | (2006.01) |
| ***B32B 15/09*** | (2006.01) |
| ***B32B 15/095*** | (2006.01) |
| ***B32B 15/20*** | (2006.01) |
| ***B32B 27/12*** | (2006.01) |
| ***B32B 27/32*** | (2006.01) |
| ***B32B 27/36*** | (2006.01) |
| ***B32B 27/40*** | (2006.01) |
| ***B32B 37/06*** | (2006.01) |
| ***B32B 37/10*** | (2006.01) |
| ***B32B 37/18*** | (2006.01) |

(52) U.S. Cl.

CPC ............ *B32B 15/085* (2013.01); *B32B 15/09* (2013.01); *B32B 15/095* (2013.01); *B32B 15/20* (2013.01); *B32B 27/12* (2013.01); *B32B 27/32* (2013.01); *B32B 27/36* (2013.01); *B32B 27/40* (2013.01); *B32B 37/06* (2013.01); *B32B 37/10* (2013.01); *B32B 37/185* (2013.01); *B32B 2274/00* (2013.01); *B32B 2307/406* (2013.01); *B32B 2307/416* (2013.01); *B32B 2307/50* (2013.01); *B32B 2307/7375* (2023.05)

(58) Field of Classification Search

CPC ... B32B 37/10; B32B 37/185; B32B 2274/00; B32B 2307/406; B32B 2307/416; B32B 2307/50; B32B 2307/7375; B32B 2307/514; B32B 2311/04; B32B 2311/08; B32B 2451/00; B32B 2323/10; B32B 2367/00; B32B 2375/00; B32B 3/30; B32B 3/28; B32B 3/08; B32B 5/028; B32B 7/022; B32B 7/02; B32B 2037/268; B32B 38/10; B29C 51/16; B29C 59/02; B29C 65/70

USPC ...... 156/212, 219, 233, 245, 306.3; 427/147

See application file for complete search history.

(56) References Cited

U.S. PATENT DOCUMENTS

2011/0020606 A1* 1/2011 Herslow ................ B32B 27/36 156/182

2011/0128600 A1 6/2011 Tompkin

FOREIGN PATENT DOCUMENTS

| | | | | |
|---|---|---|---|---|
| EP | 1 780 005 | A1 | 5/2007 | |
| EP | 3 409 460 | A1 | 12/2018 | |
| EP | 3871856 | A1 * | 9/2021 | ............ B29C 51/46 |
| JP | 52-960 | | 1/1977 | |
| JP | 55-86626 | A | 6/1980 | |
| JP | 4-24342 | U | 2/1992 | |
| JP | 10-333616 | A | 12/1998 | |
| JP | 2004-98702 | A | 4/2004 | |
| JP | 2005-103794 | A | 4/2005 | |
| JP | 2008-87392 | A | 4/2008 | |
| JP | 2009-511310 | A | 3/2009 | |
| JP | 2010-76132 | A | 4/2010 | |
| JP | 2011-37034 | A | 2/2011 | |
| JP | 2016-190480 | A | 11/2016 | |
| JP | 2017-83844 | A | 5/2017 | |
| JP | 2017-132111 | A | 8/2017 | |
| JP | 2018-130859 | A | 8/2018 | |
| JP | 2018-171838 | A | 11/2018 | |
| JP | 2018-171883 | A | 11/2018 | |
| JP | 2020-104316 | A | 7/2020 | |
| JP | 2020-179611 | A | 11/2020 | |
| JP | 2023-20734 | A | 2/2023 | |
| KR | 10-2011-0018635 | A | 2/2011 | |
| KR | 10-2019-0019201 | A | 2/2019 | |
| TW | M462275 | U1 | 9/2013 | |
| TW | 201728474 | A | 8/2017 | |
| TW | I679132 | B | 12/2019 | |
| WO | 2022/217825 | A1 | 10/2022 | |

* cited by examiner

COMPOSITE SHEET, METHOD FOR MANUFACTURING THE SAME, AND COMPOSITE STRUCTURE

BACKGROUND OF THE INVENTION

1. Field of the Invention

The present disclosure relates to a composite sheet, a method for manufacturing the same and a composite structure, and more particularly, to a composite sheet having a metal layer, a method for manufacturing the same and a composite structure having the composite sheet.

2. Description of the Prior Art

Because metal materials have bright gloss, metal materials are widely applied to manufacture logos and decorative patterns of products to enhance the recognition and beauty of products. However, when the logos or decorative patterns are manufactured by laminating methods, the processes often decrease the gloss of metal materials. As a result, the visual effects provided by the finished products cannot meet the expectations.

SUMMARY OF THE INVENTION

According to one embodiment of the present disclosure, a composite sheet includes a first resin layer, a metal layer and a second resin layer. The first resin layer includes a first surface, a second surface opposite to the first surface, and a plurality of first resin protrusions protruding from the second surface. The metal layer is capable of reflecting visible light. The metal layer includes a third surface, a fourth surface opposite to the third surface, and a plurality of metal protrusions protruding from the fourth surface. The metal layer is fixed on the second surface through the third surface. The plurality of metal protrusions correspond to the plurality of first resin protrusions. The second resin layer includes a fifth surface, a sixth surface opposite to the fifth surface, and a plurality of second resin protrusions protruding from the sixth surface. The second resin layer is removably disposed on the fourth surface through the fifth surface. The plurality of second resin protrusions correspond to the plurality of metal protrusions.

According to another embodiment of the present disclosure, a method for manufacturing a composite sheet includes steps as follows. A film layer stack is provided, in which the film layer stack includes a first resin layer, a metal layer and a second resin layer stacked in sequence, the metal layer is removably disposed on the first resin layer, and the second resin layer is removably disposed on the metal layer. A first hot-pressing step is performed, in which the film layer stack is heated and pressurized to fix the metal layer on the first resin layer and maintain the second resin layer to be removably disposed on the metal layer. A release member is stacked on the film layer stack, in which a surface of the release member is formed with a plurality of concave portions, and the surface of the release member faces a surface of the metal layer away from the first resin layer. A second hot-pressing step is performed, in which the release member and the film layer stack are heated and pressurized, so that the metal layer is formed with a plurality of metal protrusions corresponding to the plurality of concave portions, and the first resin layer is formed with a plurality of first resin protrusions corresponding to the plurality of concave portions. The release member is removed.

According to yet another embodiment of the present disclosure, a method for manufacturing a composite sheet includes steps as follows. A film layer stack is provided, in which the film layer stack includes a first resin layer, a metal layer and a second resin layer stacked in sequence, the metal layer is removably disposed on the first resin layer, the second resin layer is removably disposed on the metal layer, and a surface of the first resin layer facing the metal layer is formed with a plurality of first resin protrusions. A hot-pressing step is performed, in which the film layer stack is heated and pressurized to fix the metal layer on the first resin layer, maintain the second resin layer to be removably disposed on the metal layer, allow the metal layer to be formed with a plurality of metal protrusions corresponding to the plurality of first resin protrusions, and allow the second resin layer to be formed with a plurality of second resin protrusions corresponding to the plurality of first resin protrusions.

According to yet another embodiment of the present disclosure, a composite structure includes the aforementioned composite sheet and a substrate member fixed on the first surface.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
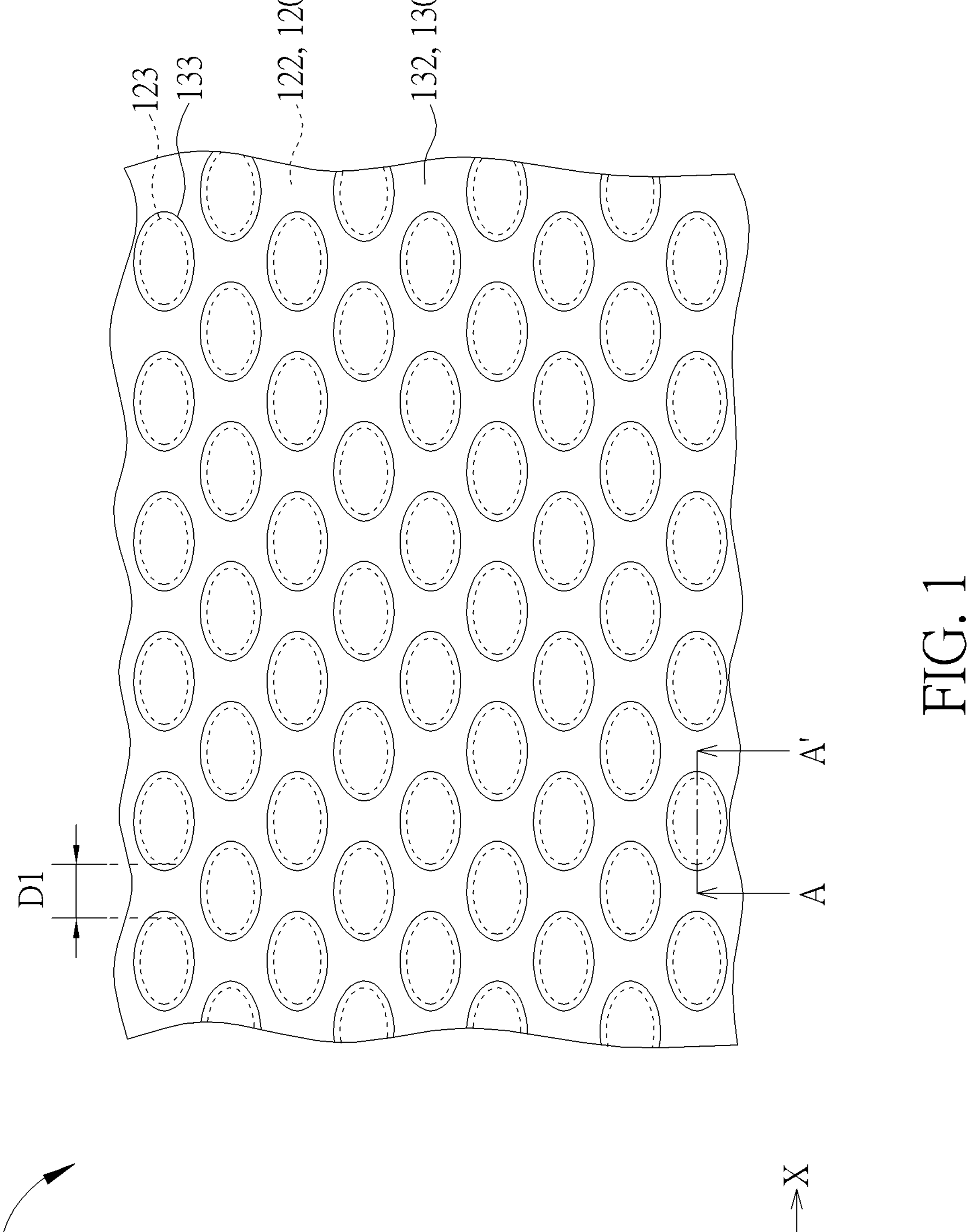
FIG. 1 is a schematic top view of a composite sheet according to an embodiment of the present disclosure.

In order to enable the skilled persons in the art to better understand the present disclosure, hereinafter preferred embodiments with drawings are provided for illustrating the present disclosure and the effect to be achieved. It should be noted that the drawings are simplified schematic diagrams. Therefore, only elements related to the present disclosure and combination relationship thereof are shown to provide a clearer description of the basic framework or implementation methods of the present disclosure. The actual elements and configuration may be more complicated. In addition, for the sake of convenience, the number of the elements in the drawings could be unequal to the actual number thereof, the shape and size of the elements may not draw in proportion to the actual shape and size, and the proportion thereof may be adjusted according to design requirements. The drawings of the present disclosure are all illustrated based on an XYZ rectangular coordinate system for ease of explanation.

The directional terminology in the following embodiments, such as top, bottom, left, right, front or back, is used with reference to the orientation of the Figure(s) being described. As such, the directional terminology is used for purposes of illustration and is in no way limiting.

It is understood that, although the terms first, second, third, etc. may be used herein to describe various elements, these elements should not be limited by these terms. These terms may be only used to distinguish one element from another element in the specification.

In the present disclosure, for the description of "an element is disposed on another element" or "an element is connected with another element", it may refer that "the element is in contact with the another element directly", or it may refer that "there is further another element between the element and the anther element", such that the element is not in contact with the anther element directly.

Composite Sheet

Figure 2:
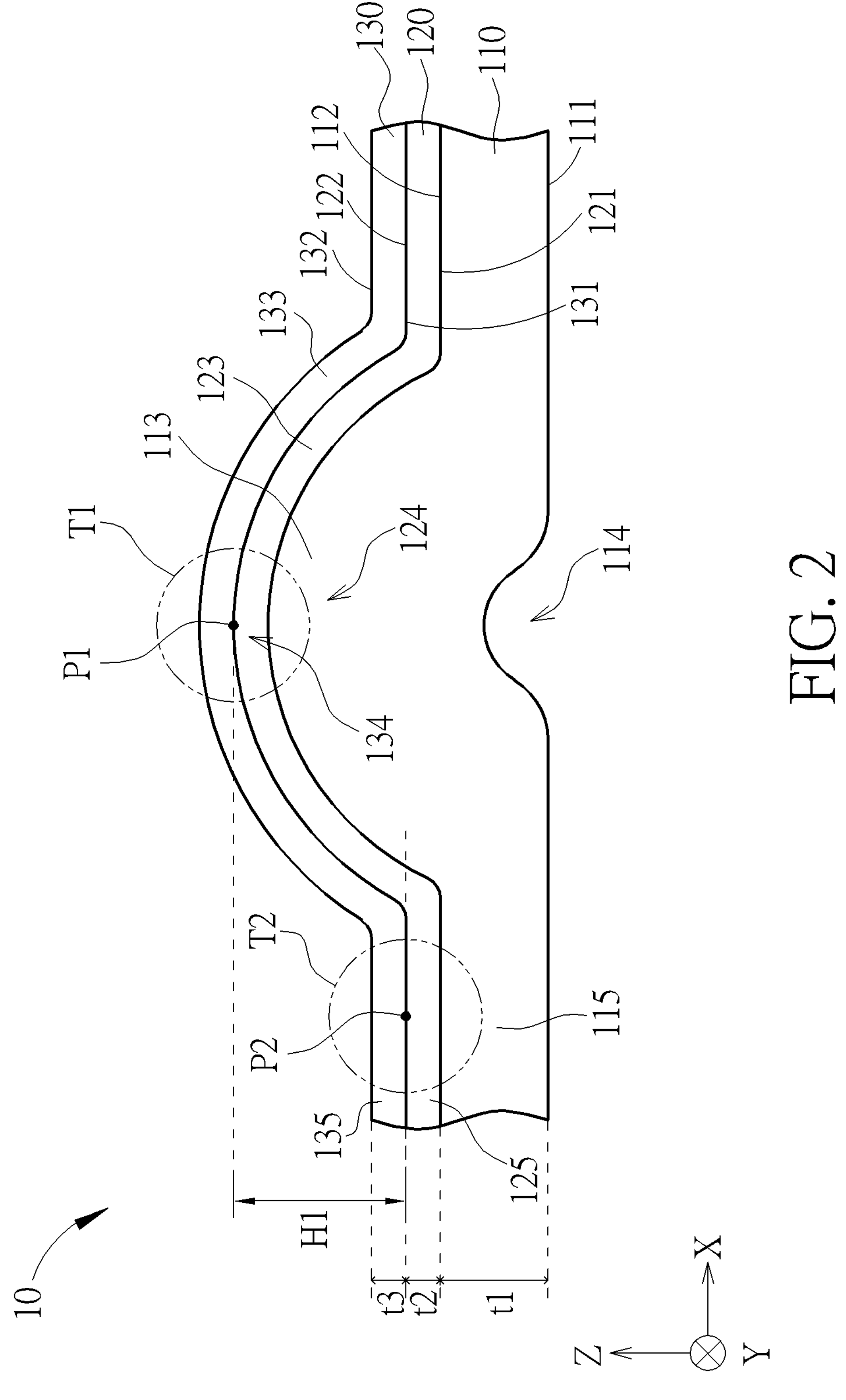
FIG. 2 is a partial cross-sectional view of the composite sheet taken along line A-A' shown in FIG. 1.

Please refer to FIG. 1 and FIG. 2. FIG. 1 is a schematic top view of a composite sheet 10 according to an embodiment of the present disclosure. FIG. 2 is a partial cross-sectional view of the composite sheet 10 taken along line A-A' shown in FIG. 1. The composite sheet 10 includes a first resin layer 110, a metal layer 120 and a second resin layer 130. The first resin layer 110 includes a first surface 111, a second surface 112 and a plurality of first resin protrusions 113. The second surface 112 is opposite to the first surface 111, and the plurality of first resin protrusions 113 protrude from the second surface 112. The metal layer 120 is capable of reflecting visible light. The metal layer 120 includes a third surface 121, a fourth surface 122 and a plurality of metal protrusions 123. The metal layer 120 is fixed on the second surface 112 through the third surface 121. The fourth surface 122 is opposite to the third surface 121. The plurality of metal protrusions 123 protrude from the fourth surface 122. The plurality of metal protrusions 123 correspond to the plurality of first resin protrusions 113. The second resin layer 130 includes a fifth surface 131, a sixth surface 132 and a plurality of second resin protrusions 133. The second resin layer 130 is removably disposed on the fourth surface 122 through the fifth surface 131. The sixth surface 132 is opposite to the fifth surface 131. The plurality of second resin protrusions 133 protrude from the sixth surface 132, and the plurality of second resin protrusions 133 correspond to the plurality of metal protrusions 123.

In this embodiment, the second resin layer 130 is made of a transparent material, and the metal layer 120 is made of an opaque material. Therefore, the fourth surface 122 and the metal protrusion 123 (shown by dotted lines) of the metal layer 120 can be seen from the view angle of FIG. 1, but the present disclosure is not limited thereto. In other embodiments, the second resin layer 130 may be made of an opaque material. The second resin layer 130 is configured to protect the metal layer 120. For example, when performing a hot-pressing step, the second resin layer 130 can protect the metal layer 120 from directly contacting with a release member (such as the release member 50 shown in FIG. 6) or a hot-pressing apparatus (exemplarily refer to the hot-pressing apparatus 40 shown in FIG. 9), so as to prevent the smoothness of the fourth surface 122 of the metal layer 120 from being destroyed by the surfaces of the release member and the hot-pressing apparatus which are relatively rough to affect the gloss of the metal layer 120. The second resin layer 130 is configured to be removably disposed on the fourth surface 122 of the metal layer 120. In the subsequent application, the second resin layer 130 may be removed according to actual needs. Moreover, other protective layers (such as the third resin layer 140*a* shown in FIG. 7) may be disposed on the metal layer 120 according to actual needs.

In this embodiment, the first resin layer 110 bulges along a direction (such as the direction Z) from the first surface 111 to the second surface 112 to form the first resin protrusions 113, and the first surface 111 is correspondingly formed with the first recessed spaces 114. The portion of the first resin layer 110 not bulged is a first resin flat portion 115. The metal layer 120 bulges along a direction from the third surface 121 to the fourth surface 122 to form the metal protrusions 123, and the third surface 121 is correspondingly formed with the second recessed spaces 124. The portion of the metal layer 120 not bulged is a metal flat portion 125. The second resin layer 130 bulges along a direction from the fifth surface 131 to the sixth surface 132 to form the second resin protrusions 133, and the fifth surface 131 is correspondingly formed with the third recessed spaces 134. The portion of the second resin layer 130 not bulged is the second resin flat portion 135. In this embodiment, the first resin protrusions 113 are correspondingly disposed in the second recessed spaces 124, and the metal protrusions 123 are correspondingly disposed in the third recessed spaces 134.

A ratio of the thickness t2 of the metal layer 120 to the thickness t1 of the first resin layer 110 may range from 0.006 to 0.06, and a ratio of the thickness t3 of the second resin layer 130 to the thickness t1 of the first resin layer 110 may range from 0.01 to 0.1. For example, the thickness t1 of the first resin layer 110 may range from 0.5 mm to 1.5 mm, the thickness t2 of the metal layer 120 may range from 10 μm to 30 μm, and the thickness t3 of the second resin layer 130 may range from 15 μm to 50 μm. The breaking elongation of the first resin layer 110 may range from 300% to 600%, and the melting point of the first resin layer 110 may range from 90° C. to 180° C. The breaking elongation of the second resin layer 130 may range from 5% to 200%, and the melting point of the second resin layer 130 may range from 130° C. to 260° C. The aforementioned data of breaking elongation may be measured based on the specifications of ASTM D412. For example, the material of the first resin layer 110 may include thermoplastic polyurethane (TPU). The thermoplastic polyurethane may be a non-recycled, transparent thermoplastic polyurethane with a breaking elongation of about 500%, a melting point of about 170° C., and a thickness t1 of 0.5 mm, 0.7 mm or 1 mm. Alternatively, the thermoplastic polyurethane may be a recycled, black thermoplastic polyurethane, which has a breaking elongation of about 450%, a melting point of about 120° C., and a thickness t1 of 0.5 mm, 0.7 mm or 1 mm. The material of the second resin layer 130 may include polyethylene terephthalate (PET), which has a breaking elongation of about 6%, a melting point of about 240° C., and a thickness t3 of 20 μm. Alternatively, the second resin layer 130 may include oriented polypropylene (OPP), which has a breaking elongation of about 160%, a melting point of about 140° C., and a thickness t3 of 23 μm.

The material of the metal layer 120 may include aluminum, silver, gold, chromium or a combination thereof. Thereby, the metal layer 120 may have delicate gloss. Moreover, the material of the metal layer 120 may selectively include a polymer material to improve the ductility and the malleability thereof. As shown in FIG. 1, the spaced distance D1 between two adjacent ones of the metal protrusions 123 may range from 0.1 mm to 10 mm. As shown in FIG. 2, the height H1 of each of the metal protrusions 123 protruding from the fourth surface 122 may range from 0.1 mm to 1 mm. That is, the metal protrusions 123 are three-dimensional structures that can be observed by naked eyes, and can provide special visual effects and decorated styles. The aforementioned spaced distance D1 may be the shortest distance between two adjacent metal protrusions 123. A normal direction may be defined at the composite sheet 10, and the normal direction may be parallel to the direction Z. The aforementioned height H1 may be the distance in the normal direction between the top surface (not labeled) of the metal flat portion 125 and the vertex P1 of the metal protrusion 123, as shown in FIG. 2. In other embodiments, metal protrusions of a composite sheet may be designed to present a more complex grain or pattern, such as grid grain, zigzag grain, iron plate grain, water ripple grain, wood grain, lychee grain, etc., which is not limited to the rivet pattern of this embodiment.

The gloss of each of the metal protrusions 123 may be greater than 80 GU (Gloss Unit). The aforementioned data of gloss may be measured based on the specifications of ASTM D523. The measurement system is based on the refractive index of light with a wavelength of 589.3 nm on a polished glass surface, and the measurements are performed by a solar simulator and a detector simulating human visual response. The solar simulator can emit incident light, and the incident light hits on a surface of an object to be measured by a predetermined angle (in this embodiment, the object to be measured is, for example, one of the metal protrusion 123 or the metal flat portion 125). The detector simulating human visual response detects the reflected light of the incident light, and the gloss of the object to be measured at the predetermined angle can be calculated based on the brightnesses of the incident light and the reflected light. How to calculate the gloss based on the brightnesses of incident light and reflected light is well known to the person having ordinary skill in the art, and is not described herein.

Figure 3:
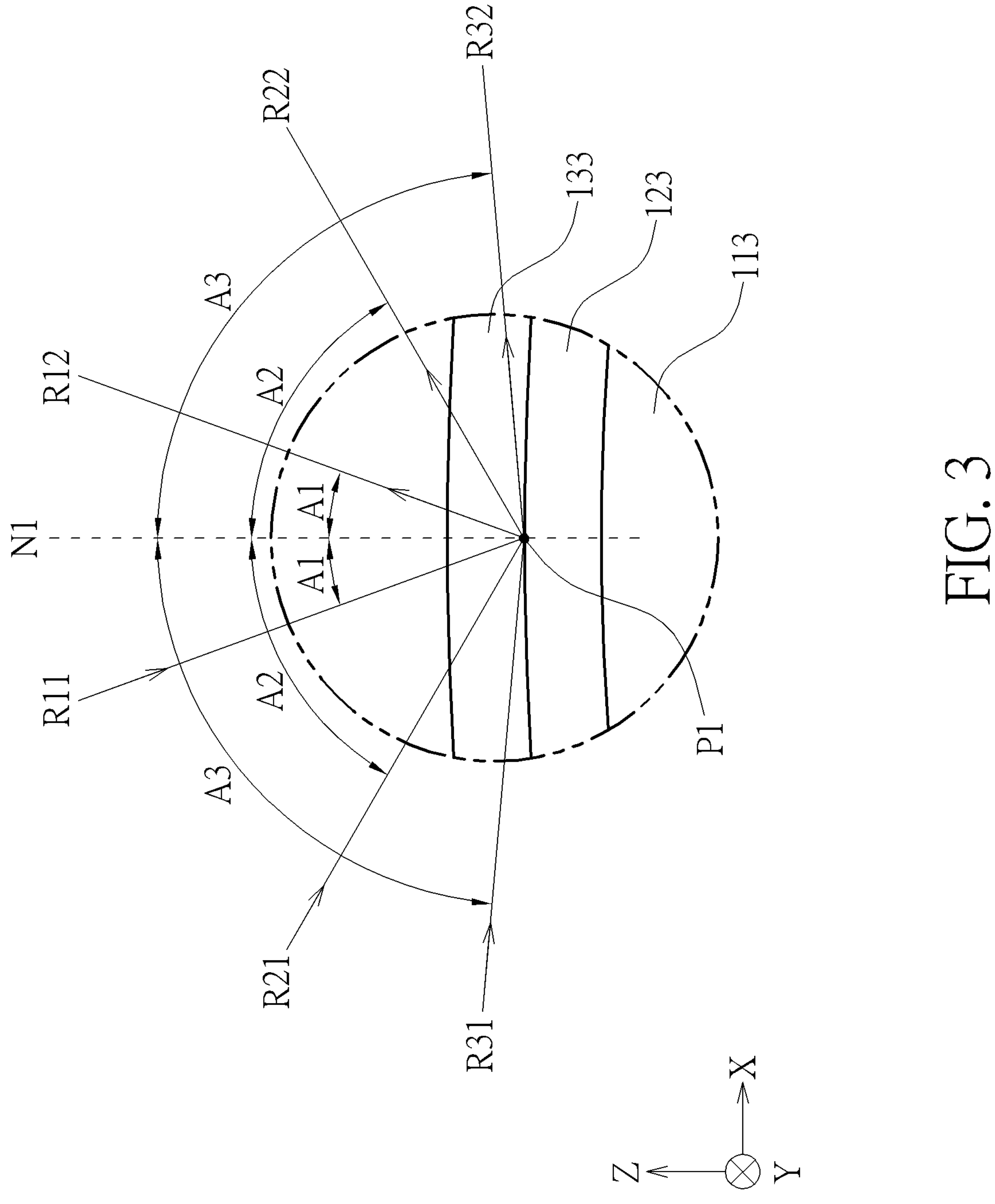
FIG. 3 is an enlarged view of a portion T1 of a metal protrusion shown in FIG. 2.
Figure 4:
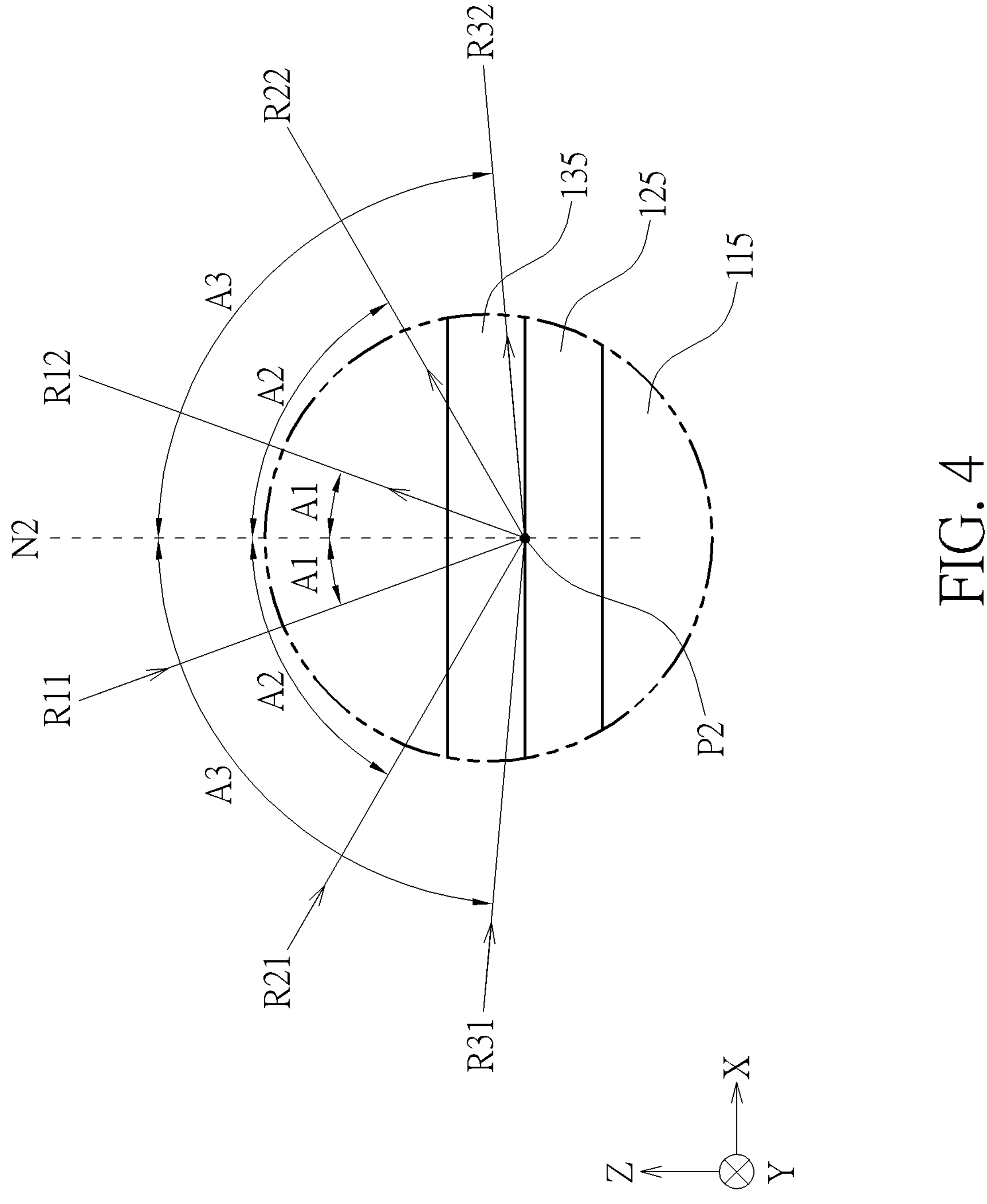
FIG. 4 is an enlarged view of a portion T2 of a metal flat portion shown in FIG. 2.

Please refer to FIG. 3, which is an enlarged view of a portion T1 of the metal protrusion 123 shown in FIG. 2. A normal direction N1 can be defined at the vertex P1 of the metal protrusion 123. The incident light with an incident angle of the predetermined angle A1 is R11 and the reflected light thereof is R12. The incident light with an incident angle of the predetermined angle A2 is R21 and the reflected light thereof is R22. The incident light with an incident angle of the predetermined angle A3 is R31 and the reflected light thereof is R32. Herein, the predetermined angle A1 is 20 degrees according to the normal direction N1, the predetermined angle A2 is 60 degrees according to the normal direction N1, and the predetermined angle A3 is 85 degrees according to the normal direction N1, which are exemplary. As mentioned above, the glosses of the vertex P1 of the metal protrusion 123 at 20 degrees, 60 degrees and 85 degrees can be calculated based on the brightnesses of the incident light R11, R21 and R31 and the reflected light R12, R22 and R32, respectively. Please refer to FIG. 4, which is an enlarged view of the portion T2 of the metal flat portion 125 shown in FIG. 2. A normal direction N2 can be defined at the point P2 of the metal flat portion 125. Similarly, for the predetermined angles A1, A2 and A3, the incident light R11, R21 and R31 and the reflected light R12, R22 and R32, a reference may be made to the relevant description of FIG. 3. As mentioned above, the glosses of the point P2 of the metal flat portion 125 at 20 degrees, 60 degrees and 85 degrees can be calculated based on the brightnesses of the incident light R11, R21 and R31 and the reflected light R12, R22, R32, respectively. Comparing FIG. 3 with FIG. 4, as the vertex P1 of the metal protrusion 123 shown in FIG. 2 is enlarged, from viewpoints of the incident light R11, R21 and R31, the curved surface which the vertex P1 is located at tends to be a flat surface, and the vertex P1 may be regarded as a point on the flat surface (practically, as a measured area is less than an area of a circle with a diameter of 2 mm). Therefore, the gloss of the vertex P1 would tend to be similar to the gloss of the point P2. According to an embodiment of the present disclosure, the glosses of the vertex P1 and the point P2 at 20 degrees (of incident angle) are greater than 300 GU, the glosses of the vertex P1 and the point P2 at 60 degrees (of incident angle) are greater than 200 GU, and the glosses of the vertex P1 and the point P2 at 85 degrees (of incident angle) are greater than 80 GU.

Method for Manufacturing Composite Sheet

Figure 5:
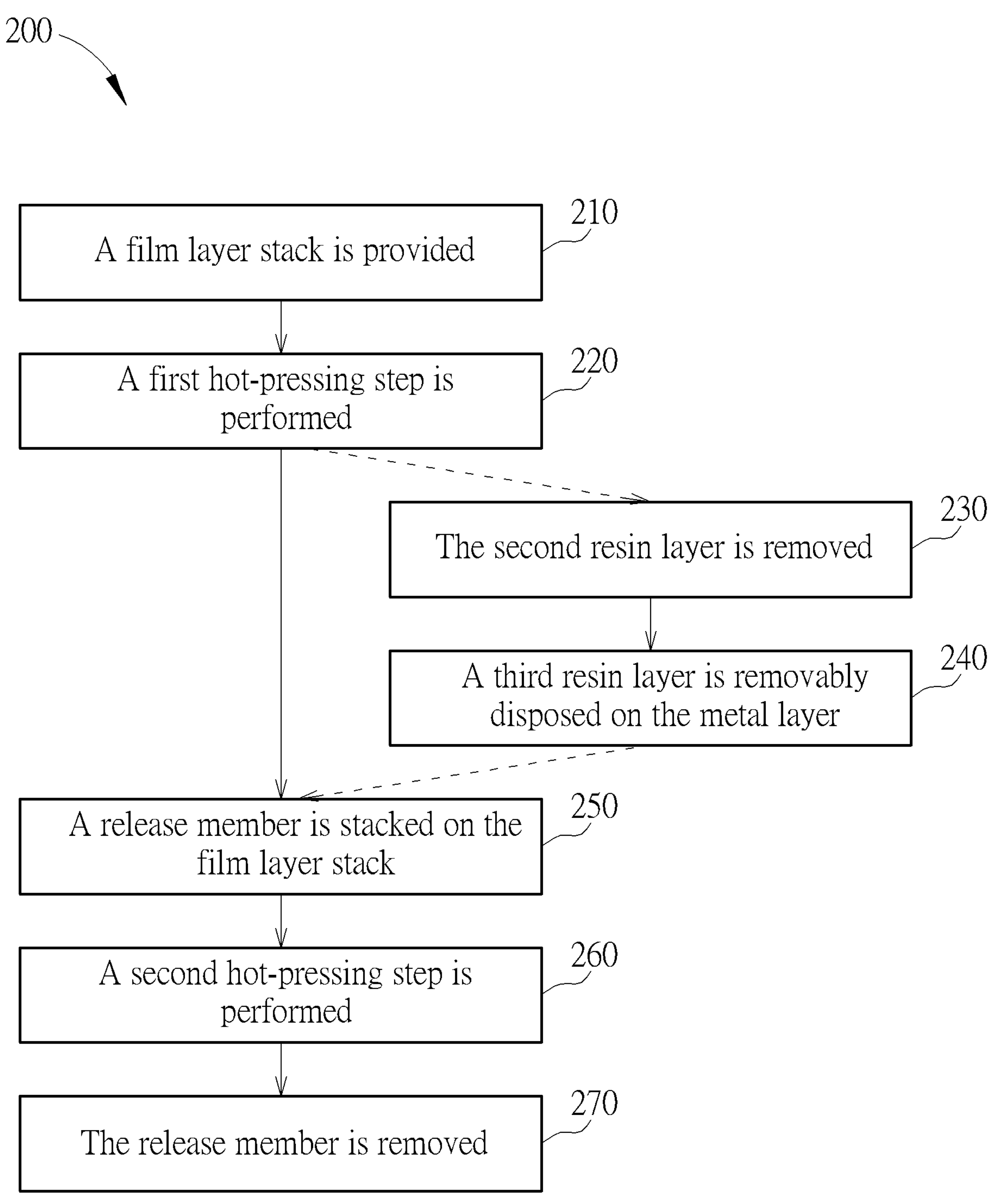
FIG. 5 is a flow diagram showing a method for manufacturing a composite sheet according to an embodiment of the present disclosure.

Please refer to FIG. 5, which is a flow diagram showing a method 200 for manufacturing a composite sheet according to an embodiment of the present disclosure. The method 200 for manufacturing the composite sheet includes Step 210, Step 220 and Step 250 to Step 270, and may selectively include Step 230 and Step 240. In Step 210, a film layer stack is provided, in which the film layer stack includes a first resin layer, a metal layer and a second resin layer stacked in sequence, the metal layer is removably disposed on the first resin layer, and the second resin layer is removably disposed on the metal layer. In Step 220, a first hot-pressing step is performed, in which the film layer stack is heated and pressurized to fix the metal layer on the first resin layer and maintain the second resin layer to be removably disposed on the metal layer. In Step 250, a release member is stacked on the film layer stack, in which a surface of the release member is formed with a plurality of concave portions, and the surface of the release member faces a surface of the metal layer away from the first resin layer. In Step 260, a second hot-pressing step is performed, in which the release member and the film layer stack are heated and pressurized, so that the metal layer is formed with a plurality of metal protrusions corresponding to the plurality of concave portions, and the first resin layer is formed with a plurality of first resin protrusions corresponding to the plurality of concave portions. In Step 270, the release member is removed.

Figure 6:
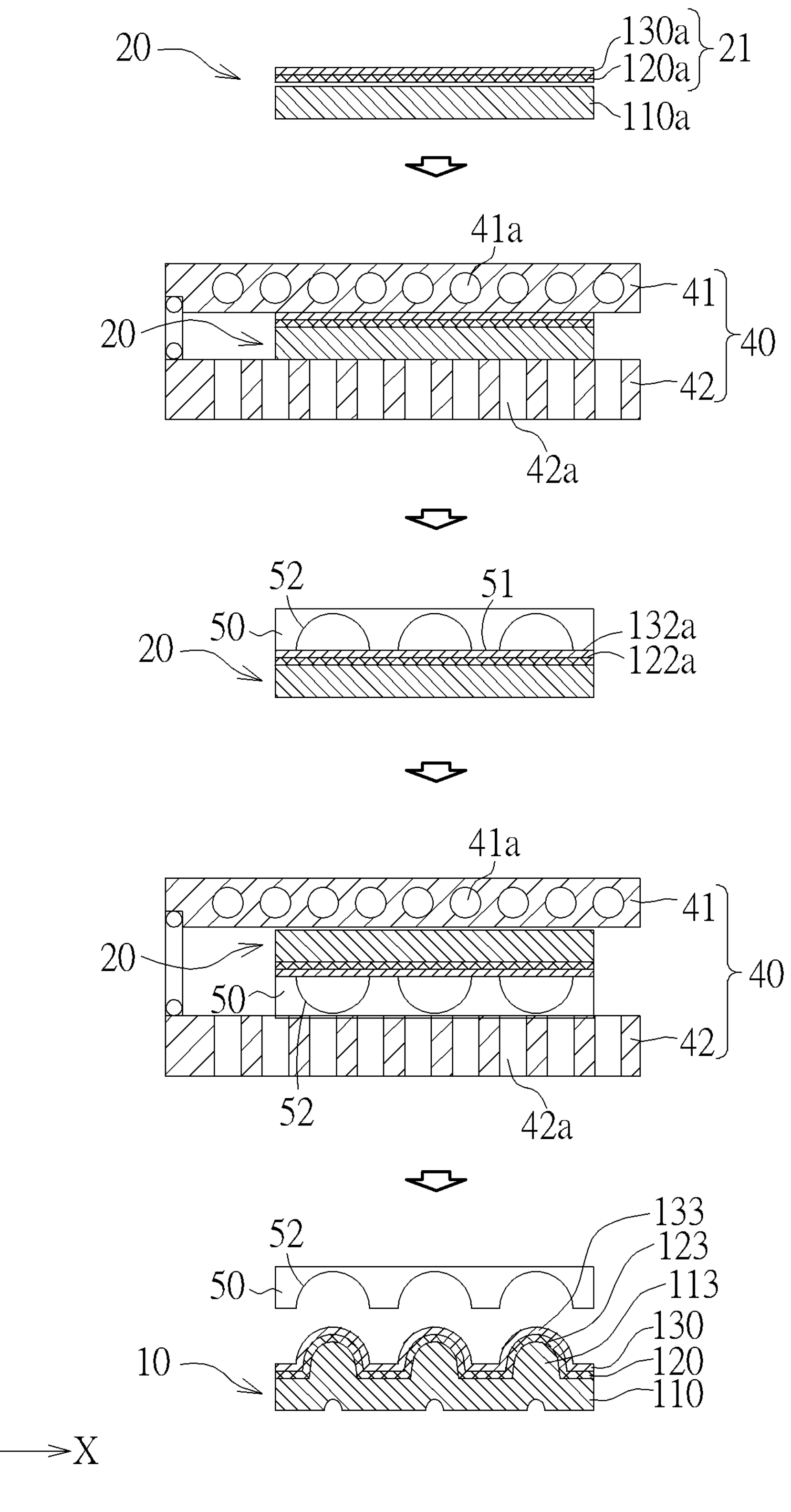
FIG. 6 is a schematic diagram showing steps of a method for manufacturing a composite sheet according to an embodiment of the present disclosure.

Please refer to FIG. 6 at the same time. FIG. 6 is a schematic diagram showing steps of the method 200 for manufacturing a composite sheet according to an embodiment of the present disclosure. First, a film layer stack 20 is provided. The film layer stack 20 includes a first resin layer **110*a*, a metal layer 120*a* and a second resin layer 130*a* stacked in sequence. The metal layer 120*a* is removably disposed on the first resin layer 110*a*, and the second resin layer 130*a* is removably disposed on the metal layer 120*a*. Herein, the second resin layer 130*a* and the metal layer 120*a* together form a composite unit 21**, and the first resin layer

110*a* is an independent film layer, which are exemplary. The second resin layer 130*a* may be a release film, and the metal layer 120*a* may be attached to the second resin layer 130*a* in a releasable manner to form the composite unit 21. More specific, the metal layer 120*a* may be a metal film, and the second resin layer 130*a* may be a protective layer attached to the metal film, and the second resin layer 130*a* may be separated from the metal film by tearing off or peeling off. The film layer stack 20 is provided by stacking the composite unit 21 on the first resin layer 110*a*, in which the metal layer 120*a* of the composite unit 21 faces the first resin layer 110*a*, and the metal layer 120*a* and the first resin layer 110*a* are not fixed with each other through adhesion or attachment.

Next, the film layer stack 20 is placed in a hot-pressing apparatus 40 to perform the first hot-pressing step, in which the film layer stack 20 is heated and pressurized to fix the metal layer 120*a* on the first resin layer 110*a* and maintain the second resin layer 130*a* to be removably disposed on the metal layer 120*a*. Specifically, in the first hot-pressing step, the first resin layer 110*a* is softened by the hot pressing. After the first resin layer 110*a* is cooled, the metal layer 120*a* may be fixed on the first resin layer 110*a* through adhesion. Since the melting point of the second resin layer 130*a* is higher than the melting point of the first resin layer 110*a*, the second resin layer 130*a* is basically not affected by the first hot-pressing step, so that the second resin layer 130*a* does not adhere to the metal layer 120*a* and can maintain to be removably disposed of the metal layer 120*a*. The hot-pressing apparatus 40 includes a hot-pressing module 41 and a vacuum module 42. The hot-pressing module 41 includes a plurality of heating units 41*a*. The hot-pressing module 41 is configured to heat the film layer stack 20. The vacuum module 42 includes a plurality of gas flow channels 42*a*. The vacuum module 42 is configured to evacuate gas from the film layer stack 20 (vacuumization). With the vacuum module 42 evacuating the gas from the film layer stack 20, the hot-pressing apparatus 40 can simultaneously apply negative pressure to the film layer stack 20. Thereby, the melting point of the first resin layer 110*a* may be lowered, so as to reduce the energy consumption required by the process. The first hot-pressing step may be performed under the following conditions: the heating temperature ranges from 80° C. to 170° C., the heating time ranges from 30 seconds to 120 seconds, and the pressure applied by the hot-pressing apparatus 40 to the film layer stack 20 ranges from 0.8 bar to 1.2 bar.

Next, the film layer stack 20 is taken out from the hot-pressing apparatus 40, and a release member 50 is stacked on the film layer stack 20, in which a surface 51 of the release member 50 is formed with a plurality of concave portions 52, and the surface 51 of the release member 50 faces a surface 122*a* of the metal layer 120*a* away from the first resin layer 110*a*. Herein, the surface 51 of the release member 50 is disposed on the surface 132*a* of the second resin layer 130*a*. That is, the release member 50 is indirectly disposed on the metal layer 120*a* through the second resin layer 130*a*. Next, the release member 50 and the film layer stack 20 are placed in the hot-pressing apparatus 40 to perform a second hot-pressing step, in which the release member 50 and the film layer stack 20 are heated and pressurized, so that the second resin layer 130*a* is formed with a plurality of second resin protrusions 133 corresponding to the plurality of concave portions 52, the metal layer 120*a* is formed with a plurality of metal protrusions 123 corresponding to the plurality of concave portions 52, and the first resin layer 110*a* is formed with a plurality of first resin protrusions 113 corresponding to the plurality of concave portions 52. In this embodiment, while the film layer stack 20 and the release member 50 are heated and pressurized by the hot-pressing apparatus 40, the gas between the film layer stack 20 and the release member 50 can be evacuated, so that the film layer stack 20 may fall in with the release member 50 under negative pressure (i.e., a snug fit between the film layer stack 20 and the release member 50 may be achieved under negative pressure). After the second hot-pressing step, the second resin layer 130*a* becomes the second resin layer 130 with the second resin protrusions 133, the metal layer 120*a* becomes the metal layer 120 with the metal protrusions 123, and the first resin layer 110*a* becomes the first resin layer 110 with the first resin protrusions 113. That is, the film layer stack 20 becomes the composite sheet 10. The second hot-pressing step may be performed under the following conditions: the heating temperature ranges from 90° C. to 180° C., the heating time ranges from 50 seconds to 300 seconds, and the pressure applied by the hot-pressing apparatus 40 to the film layer stack 20 ranges from 0.8 bar to 1.2 bar. With the second hot-pressing step, the first resin layer 110*a* and the second resin layer 130*a* are heated and softened, and the three-dimensional pattern (i.e., the layout presented by the concave portions 52) of the release member 50 can be reproduced to the film layer stack 20 to form the composite sheet 10. At last, the release member 50 and the composite sheet 10 are taken out from the hot-pressing apparatus 40, and the release member 50 is removed, so as to complete the manufacture of the composite sheet 10. For details of the composite sheet 10, a reference may be made to the aforementioned description, and are not repeated herein.

According to the above description, the composite sheet 10 with a bright and glossy three-dimensional pattern (i.e., a layout presented by the metal protrusions 123) is manufactured by the process similar to hot transfer pressing, which is a dry process. Compared with wet coating processes, a dry process does not require organic solvents and/or dispersants, which can effectively reduce intermediate products (such as toxic gases) and is beneficial to the environmental protection. Moreover, by utilizing dry process, the manufacture of composite sheets can be simplified, and the costs due to raw materials and environmental safeties may be reduced. On the other hand, compared with electroplating, evaporation or sputtering processes, the present disclosure does not require the use of highly polluting electrolytic cells and expensive vapor deposition equipment, and is beneficial to reduce industrial waste liquids and production costs.

Please refer back to FIG. 5. The method 200 for manufacturing the composite sheet may selectively include Step 230 and Step 240. After Step 220 (i.e., the first hot-pressing step) is performed, Step 230 and Step 240 may be performed according to needs. In Step 230, the second resin layer is removed. In Step 240, a third resin layer (to replace the second resin layer) is removably disposed on the metal layer. In this case, the following Step 260 (i.e., the second hot-pressing step) further includes to allow the third resin layer to form a plurality of third resin protrusions corresponding to the plurality of concave portions.

Figure 7:
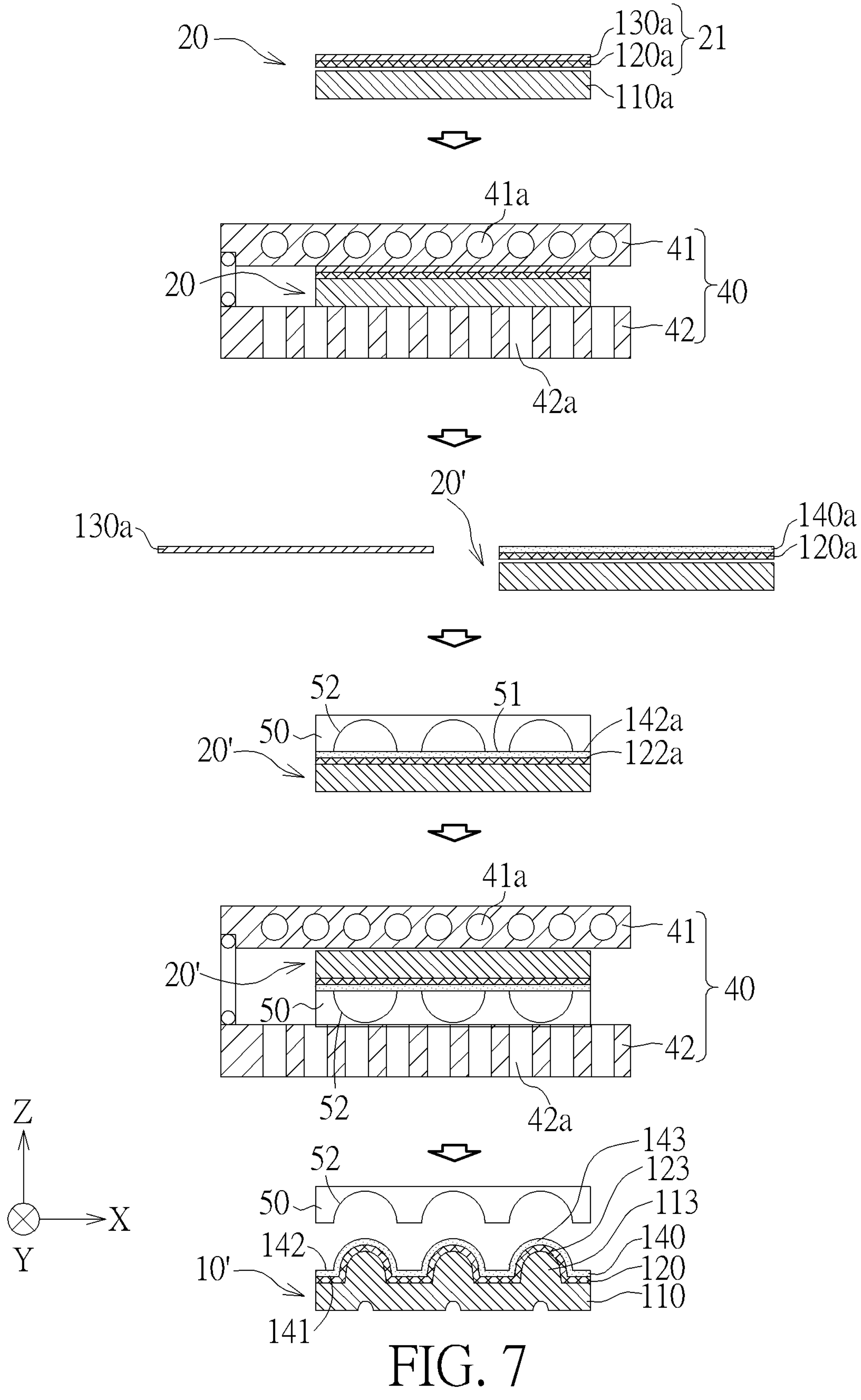
FIG. 7 is a schematic diagram showing steps of a method for manufacturing a composite sheet according to another embodiment of the present disclosure.

Please further refer to FIG. 7, which is a schematic diagram showing steps of a method 200 for manufacturing a composite sheet according to another embodiment of the present disclosure. The difference between FIG. 7 and FIG. 6 is stated as follows. After the first hot-pressing step is performed, the second resin layer 130*a* is removed, and a third resin layer 140*a* is removably disposed on the metal layer 120*a* to form another film layer stack 20'. Next, a release member 50 is also stacked on the film layer stack 20', in which the surface 51 of the release member 50 is disposed on the surface 142*a* of the third resin layer 140*a*. That is, the release member 50 is indirectly disposed on the metal layer 120*a* through the third resin layer 140*a*.

Next, the release member 50 and the film layer stack 20' are placed in the hot-pressing apparatus 40. A second hot-pressing step is performed, in which the release member 50 and the film layer stack 20' are heated and pressurized, so that the third resin layer 140*a* is formed with a plurality of f third resin protrusions 143 corresponding to the plurality of concave portions 52, the metal layer 120*a* is formed with a plurality of metal protrusions 123 corresponding to the plurality of concave portions 52, and the first resin layer 110*a* is formed with a plurality of first resin protrusion 113 corresponding to the plurality of concave portions 52. In the second hot-pressing step, the first resin layer 110*a* and the third resin layer 140*a* are heated and softened, and the three-dimensional pattern (i.e., the layout presented by the concave portions 52) of the release member 50 can be reproduced to the film layer stack 20' to form the composite sheet 10'. After the second hot-pressing step, the third resin layer 140*a* becomes the third resin layer 140 with the third resin protrusions 143, the metal layer 120*a* becomes the metal layer 120 with the metal protrusions 123, and the first resin layer 110*a* becomes the first resin layer 110 with the first resin protrusions 113. That is, the film layer stack 20' becomes a composite sheet 10'. The second hot-pressing step can also be performed under the following conditions: the heating temperature ranges from 90° C. to 180° C., the heating time ranges from 50 seconds to 300 seconds, and the pressure applied by the hot-pressing apparatus 40 to the film layer stack 20' ranges from 0.8 bar to 1.2 bar. At last, the release member 50 and the composite sheet 10' are taken out from the hot-pressing apparatus 40, and the release member 50 is removed, so as to complete the manufacturing process of the composite sheet 10'.

According to the aforementioned description, the difference between the composite sheet 10' and the composite sheet 10 is that the second resin layer 130 of the composite sheet 10 is replaced by the third resin layer 140 in the composite sheet 10'. The third resin layer 140 includes a seventh surface 141, an eighth surface 142 and a plurality of third resin protrusions 143. The third resin layer 140 is removably disposed on the fourth surface 122 (see FIG. 2) through the seventh surface 141. The eighth surface 142 is opposite to the seventh surface 141, and the plurality of third resin protrusions 143 are protruded from the eighth surface 142, in which the plurality of third resin protrusions 143 correspond to the plurality of metal protrusions 123. Other details of the composite sheet 10' may be the same as that of the composite sheet 10 and are not repeated herein.

It is worth to mention that, in this embodiment, the melting point (or softening point) of the third resin layer 140*a* may be lower than the melting point (or softening point) of the second resin layer 130*a*, and/or the breaking elongation (or ductility and malleability) of the third resin layer 140*a* may be better than the breaking elongation (or ductility and malleability) of the second resin layer 130*a*. Thereby, when performing the second hot-pressing step, it is beneficial to enhance the result of reproducing the three-dimensional pattern (the layout presented by the concave portions 52) of the release member 50 to the film layer stack 20', and to maintain the gloss of the peripheral region of the metal layer 120*a*. Specifically, when the third resin layer 140*a* with a lower melting point (or softening point) or better breaking elongation (ductility and malleability) is used to cover the metal layer 120*a* to perform the second hot-pressing step, in the peripheral region of the film layer stack 20', the third resin layer 140*a* can completely cover the metal layer 120*a* because the third resin layer 140*a* is fully softened and/or fully extended, so that the unwanted inter-layer misalignment which is caused by the differences of film hardness under a fast rising heating temperature can be avoided. That is, if the second resin layer 130*a* is misaligned with other layers, it is unfavorable for the three-dimensional pattern (formed by concave portions 52) of the release member 50 to be reproduced to the metal layer 120*a* and the first resin layer 110*a* via the second resin layer 130*a*, and is also unfavorable for protecting the metal layer 120*a*. Therefore, by replacing the second resin layer 130*a* with the third resin layer 140*a* before performing the second hot-pressing step, it is beneficial to enhance the reproduced result of the three-dimensional pattern, especially in the peripheral region of the composite sheet 10', and to maintain the gloss of the metal layer 120*a* in the peripheral region, so as to maintain the consistency of quality throughout the composite sheet 10'.

Figure 8:
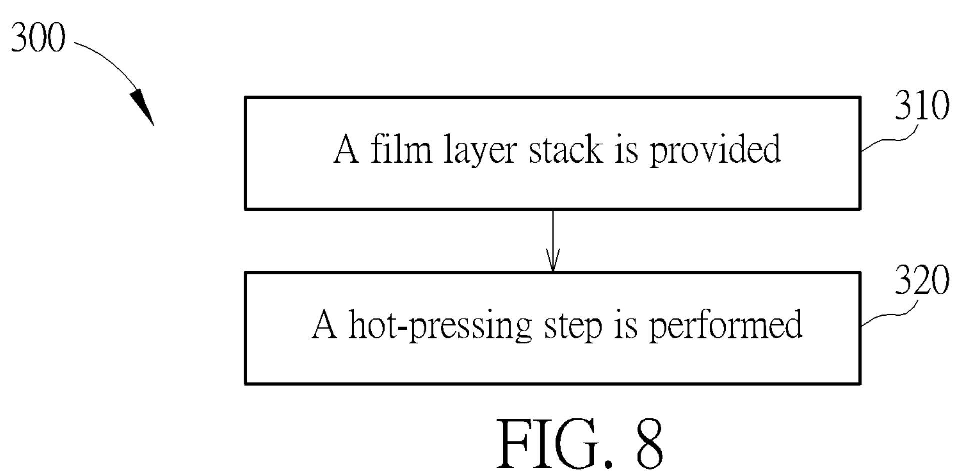
FIG. 8 is a flow diagram showing a method for manufacturing a composite sheet according to another embodiment of the present disclosure.

Please refer to FIG. 8, which is a flow diagram showing a method 300 for manufacturing a composite sheet according to another embodiment of the present disclosure. The method 300 for manufacturing the composite sheet includes Step 310 and Step 320. In Step 310, a film layer stack is provided, in which the film layer stack includes a first resin layer, a metal layer and a second resin layer stacked in sequence, in which the metal layer is removably disposed on the first resin layer, the second resin layer is removably disposed on the metal layer, and a plurality of first resin protrusions are formed on a surface of the first resin layer facing the metal layer. In Step 320, a hot-pressing step is perform, in which the film layer stack is heated and pressurized to fix the metal layer on the first resin layer and to maintain the second resin layer to be removably disposed on the metal layer. Moreover, the metal layer is formed with a plurality of metal protrusions corresponding to the plurality of first resin protrusions, and the second resin layer is formed with a plurality of second resin protrusions corresponding to the plurality of first resin protrusions.

Figure 9:
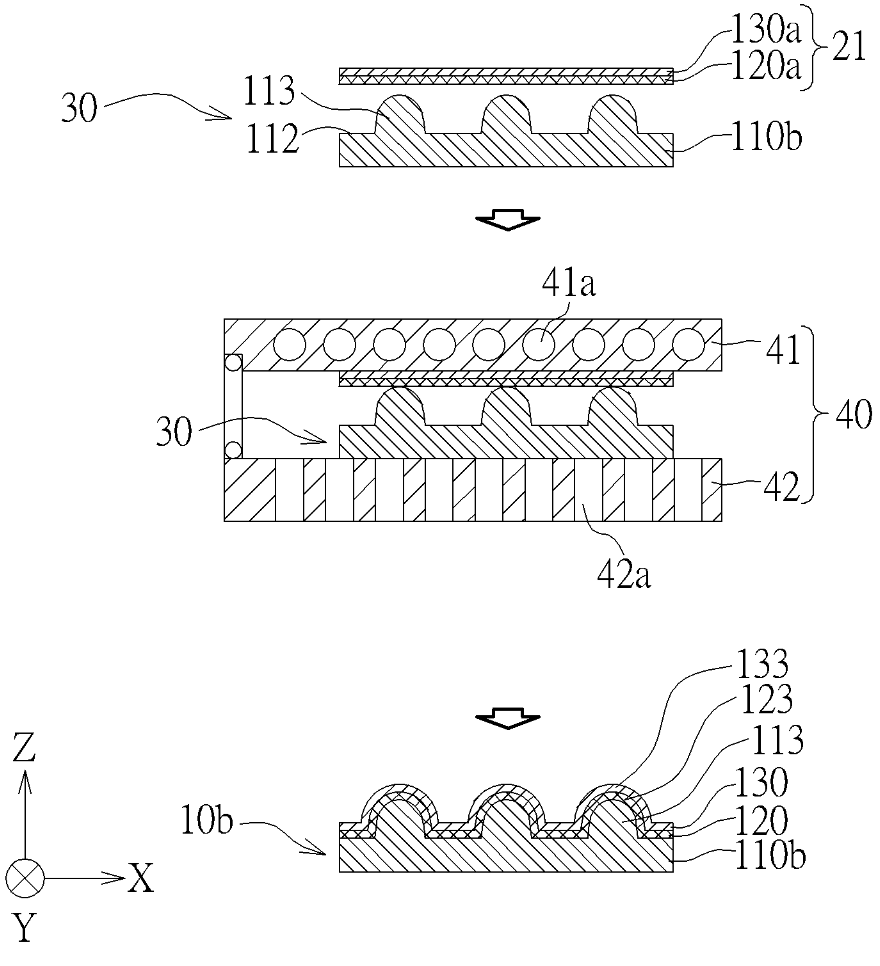
FIG. 9 is a schematic diagram showing steps of a method for manufacturing a composite sheet according to another embodiment of the present disclosure.

Please also refer to FIG. 9, which is a schematic diagram showing steps of the method 300 for manufacturing the composite sheet according to another embodiment of the present disclosure. First, a film layer stack 30 is provided, in which the film layer stack 30 includes a first resin layer 110*b*, a metal layer 120*a* and a second resin layer 130*a* stacked in sequence, the metal layer 120*a* is removably disposed on the first resin layer 110*b*, the second resin layer 130*a* is removably disposed on the metal layer 120*a*, and a second surface 112 (opposite to a not-labeled first surface) of the first resin layer 110*b* facing the metal layer 120*a* is formed with a plurality of first resin protrusions 113. Herein, the second resin layer 130*a* and the metal layer 120*a* together form a composite unit 21, and the first resin layer 110*b* is an independent film layer, which are exemplary. For detail of the composite unit 21, a reference may be made to aforementioned description. The film layer stack 30 is provided by stacking the composite unit 21 on the first resin layer 110*b*, in which the metal layer 120*a* of the composite unit 21 faces the first resin layer 110*b*, and the metal layer 120*a* and the first resin layer 110*b* are not fixed with each other through adhesion or attachment.

Next, the film layer stack 30 is placed in a hot-pressing apparatus 40 to perform a hot-pressing step, in which the film layer stack 30 is heated and pressurized to fix the metal layer 120*a* on the first resin layer 110*b* and maintain the second resin layer 130*a* to be removably disposed on the metal layer 120*a*. The hot-pressing apparatus 40 includes a hot-pressing module 41 and a vacuum module 42. The hot-pressing module 41 includes a plurality of heating units 41*a*. The hot-pressing module 41 is configured to heat the film layer stack 30. The vacuum module 42 includes a plurality of gas flow channels 42*a*. The vacuum module 42 is configured to evacuate gas from the film layer stack 30 (vacuumization). In this embodiment, while the film layer stack 30 is heated and pressurized by the hot-pressing apparatus 40, the gas between the composite unit 21 and the first resin layer 110*b* can be evacuated, so that the composite unit 21 may fall in with the first resin layer 110*b* under negative pressure (i.e., a snug fit between the composite unit 21 and the first resin layer 110*b* may be achieved under negative pressure). The hot-pressing step may be performed under the following conditions: the heating temperature ranges from 80° C. to 180° C., the heating time ranges from 30 seconds to 300 seconds, and the pressure applied by the hot-pressing apparatus 40 to the film layer stack 30 ranges from 0.8 bar to 1.2 bar. With the hot-pressing step, the first resin layer 110*b* is heated and softened. After the first resin layer 110*b* is cooled, the metal layer 120*a* can be fixed on the first resin layer 110*b* through adhesion, and the metal layer 120*a* is formed with a plurality of metal protrusions 123 corresponding to the plurality of first resin protrusions 113. At the same time, the second resin layer 130*a* is heated and softened, and the second resin layer 130*a* is formed with a plurality of second resin protrusions 133 corresponding to the plurality of first resin protrusion 113. After the hot-pressing step, the second resin layer 130*a* becomes the second resin layer 130 with the second resin protrusions 133, and the metal layer 120*a* becomes the metal layer 120 with the metal protrusions 123. That is, the film layer stack 30 becomes a composite sheet 10*b*. For details of the composite sheet 10*b*, a reference may be made to the above description, and are not repeated herein.

Composite Structure

Figure 10:
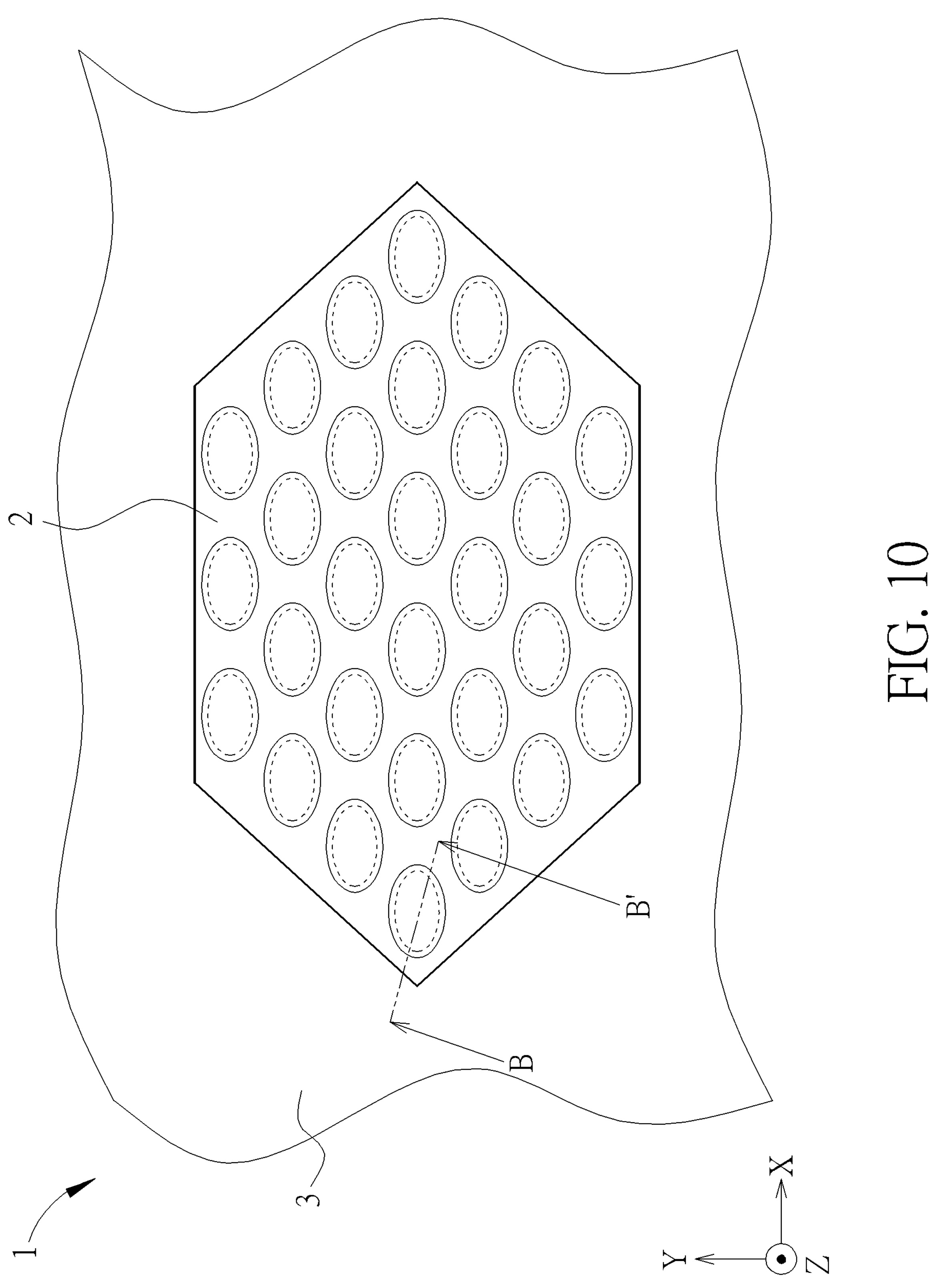
FIG. 10 is a schematic top view of a composite structure according to yet another embodiment of the present disclosure.
Figure 11:
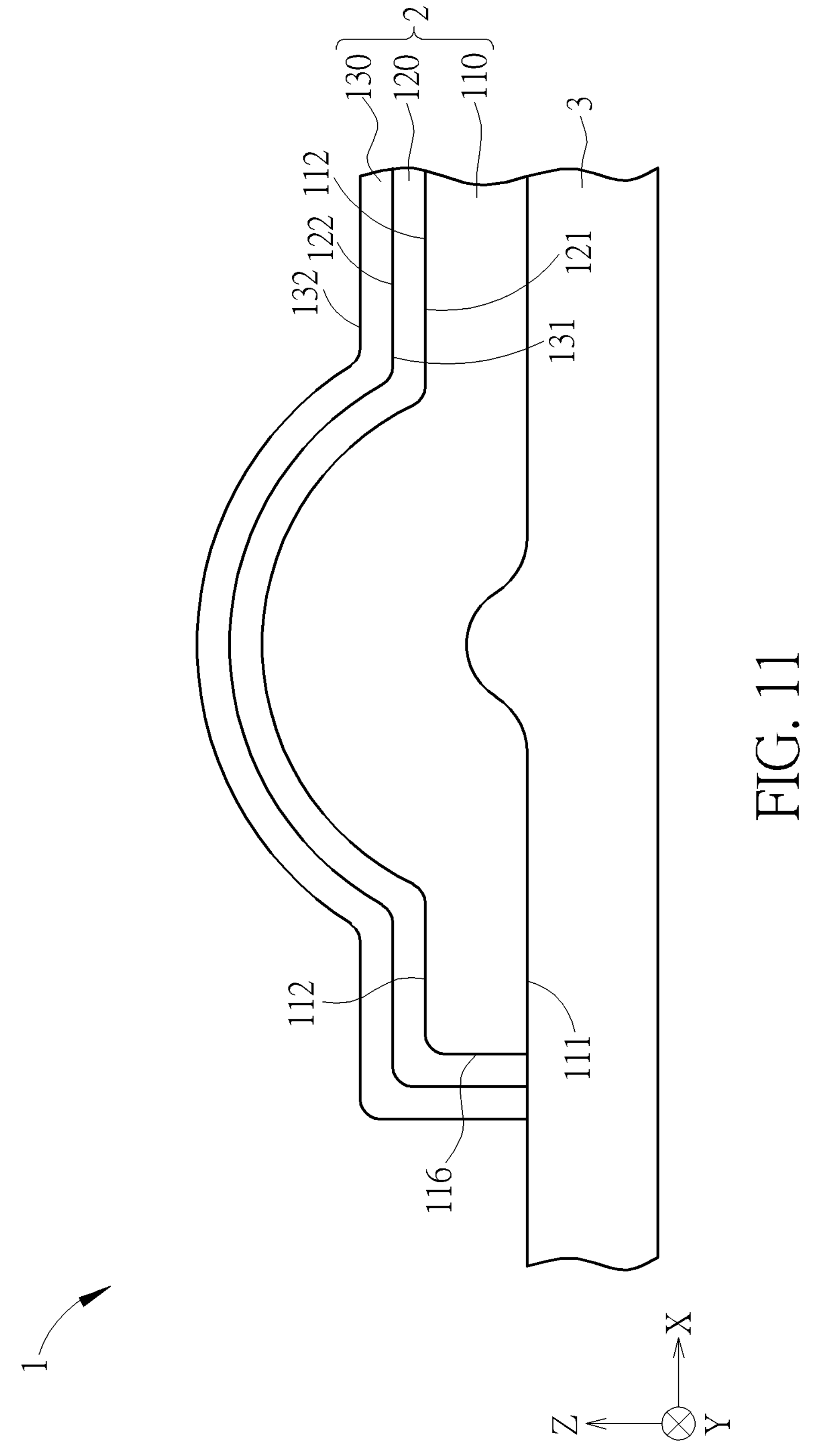
FIG. 11 is a partial cross-sectional view of the composite structure taken along line B-B' shown in FIG. 10.

Please refer to FIG. 10 and FIG. 11. FIG. 10 is a schematic top view of a composite structure 1 according to yet another embodiment of the present disclosure. FIG. 11 is a partial cross-sectional view of the composite structure 1 taken along line B-B' shown in FIG. 10. The composite structure 1 includes a composite sheet 2 and a substrate member 3. For example, the composite sheet 10 shown in FIG. 1 or the composite sheet 10' shown in FIG. 7 may be cut into desired outline shapes, such as product logos or decorative patterns (herein the shape shown in FIG. 10 exemplarily being cut into a hexagon) to form the composite sheet 2. Herein, the composite sheet 2 is exemplarily cut out from the composite sheet 10 shown in FIG. 1. In other words, in this embodiment, the main difference between the composite sheet 2 and the composite sheet 10 is the outline shape. For other details of the composite sheet 2, a reference may be made to the relevant description of the composite sheet 10. The substrate member 3 is fixed on a first surface 111 of a first resin layer 110 of the composite sheet 2. For example, the substrate member 3 may be fixed on the first surface 111 through hot melt glue or adhesive, or the substrate member 3 may be fixed on the first surface 111 through sewing. In addition, the substrate member 3 may completely cover the first surface 111 according to specific applications. Thereby, the substrate member 3 can completely carry the composite sheet 2, which is beneficial for the composite sheet 2 to be combined with other objects or become a part of other objects through the substrate member 3. The material of the substrate member 3 may include but not limited to spacer mesh fabric, and may also include fiber fabric, woven fabric, non-woven fabric, leather, etc.

As shown in FIG. 11, comparing to the composite sheet 10 (see FIG. 2), the first resin layer 110 of the composite sheet 2 may further include a side surface 116 connected between the first surface 111 and a second surface 112, and a metal layer 120 completely shields the side surface 116. Thereby, the composite structure 1 can also provide bright metallic gloss in the peripheral region, even on the edges of the composite sheet 2. As shown in FIG. 10, the outline shape and size of substrate member 3 are different from that of the composite sheet 2, but the present disclosure is not limited thereto. In other embodiments, the outline shape and size of substrate member 3 may be substantially the same as that of the composite sheet 2. For example, the substrate member 3 may be cut, so that the outer edges (not shown) of substrate member 3 are aligned with the outer edges (not labeled) of the composite sheet 2, which is favorable for combining the composite structure 1 with other objects.

Gloss of Examples and Comparative Examples

Please refer to Table 1, which shows the measurement results of glosses of several examples according to the present disclosure along with the measured glosses of several comparative examples. In Example 1, a film layer stack includes a first resin layer, a metal layer and a second resin layer. The material of the first resin layer is TPU, the metal layer is an aluminum film, and the material of the second resin layer is transparent PET. After a first hot-pressing step is performed and the second resin layer is still disposed on the metal layer, the glosses of the entire film layer stack at 20 degrees, 60 degrees and 85 degrees are measured from a surface of the second resin layer based on the specifications of ASTM D523. In other words, Example 1 is a semi-finished product formed by Step 210 and Step 220 (see FIG. 5) of the method 200 for manufacturing the composite sheet. For details of the specifications of ASTM D523, a reference may be made to the above description. The difference between Example 2 and Example 1 is stated as follows: in Example 2, after the first hot-pressing step is performed and the second resin layer is removed, the glosses of the entire film layer stack (including only the metal layer and the first resin layer) at 20 degrees, 60 degrees and 85 degrees are measured from a surface of the metal layer based on the specifications of ASTM D523. More specifically, the difference between the film layer stack of Example 2 and the film layer stack of Example 1 subjected to the measurement of gloss is that the film layer stack of Example 2 lacks the second resin layer compared to the film layer stack of Example 1. The main difference between Example 3 and Example 1 is stated as follows: the material of a second resin layer of a film layer stack is changed from transparent PET to transparent OPP; after a first hot-pressing step is performed and the second resin layer is still disposed on a metal layer, the glosses of the entire film layer stack at 20 degrees, 60 degrees and 85 degrees are measured from a surface of the second resin layer (OPP) based on the specifications of ASTM D523. The difference between Example 4 and Example 3 is stated as follows: in Example 4, after the first hot-pressing step is performed and the second resin layer is removed, the glosses of the entire film layer stack (including only the metal layer and a first resin layer) at 20 degrees, 60 degrees and 85 degrees are measured from a surface of the metal layer. More specifically, the difference between the film layer stack of Example 4 and the film layer stack of Example 3 subjected to the measurement of gloss is that the film layer stack of Example 4 lacks the second resin layer compared to the film layer stack of Example 3. The difference between Comparative Example 1 and Example 2 is stated as follows: in Comparative Example 1, a second resin layer (PET) is removed before a first hot-pressing step. Hence, after the first hot-pressing step is performed, the glosses of an entire film layer stack (including only a metal layer and a first resin layer) at 20 degrees, 60 degrees and 85 degrees are measured from a surface of the metal layer based on the specifications of ASTM D523. More specifically, the difference Comparative Example 1 and Example 2 is that the film layer stack of the Comparative Example 1 is subject to the first hot-pressing step without the second resin layer. The difference between Comparative Example 2 and Example 4 is stated as follows: in Comparative Example 2, a second resin layer (OPP) is removed before a first hot-pressing step. Hence, after the first hot-pressing step is performed, the glosses of an entire film layer stack (including only a metal layer and a first resin layer) at 20 degrees, 60 degrees and 85 degrees are measured from a surface of the metal layer based on the specifications of ASTM D523. More specifically, the difference Comparative Example 2 and Example 4 is that the film layer stack of the Comparative Example 2 is subject to the first hot-pressing step without the second resin layer.

TABLE 1

| | The second resin layer | With (w/) or without (w/o) the second resin layer during the hot-pressing step | With (w/) or without (w/o) the second resin layer during gloss measurement | Measured gloss at 20° (GU) | Measured gloss at 60° (GU) | Measured gloss at 85° (GU) |
|---|---|---|---|---|---|---|
| Example 1 | PET | w/ | w/ | 531.0 | 450.0 | 85.4 |
| Example 2 | PET | w/ | w/o | 555.0 | 465.0 | 99.7 |
| Comparative example 1 | PET | w/o | w/o | 256.0 | 213.0 | 43.0 |
| Example 3 | OPP | w/ | w/ | 534.0 | 481.0 | 89.1 |
| Example 4 | OPP | w/ | w/o | 415.0 | 355.0 | 90.1 |
| Comparative example 2 | OPP | w/o | w/o | 231.0 | 186.0 | 34.0 |

Comparing the measurement results of Example 1 and Example 2 or comparing the measurement results of Example 3 and Example 4, when the metal layers are respectively disposed with the transparent second resin layers, the glosses of the entire film layer stacks are not significantly affected by those transparent second resin layers. As demonstrated in Example 2 and Comparative Example 1, when the second resin layer (PET) is disposed on the metal layer to protect the metal layer during the first hot-pressing step, the gloss of the metal layer does not attenuate severely due to heating and pressurizing. Similarly, as demonstrated in Example 4 and Comparative Example 2, when the second resin layer (OPP) is disposed on the metal layer to protect the metal layer during the first hot-pressing step, the gloss of the metal layer does not attenuate severely due to heating and pressurizing. In other words, while a hot-pressing step is performed during a manufacture process of a composite sheet, a second resin layer can protect a metal layer from thermal energy and pressure, so as to reduce the influences of heating pressurizing on the metal layer, which is beneficial to maintain the gloss of the metal layer.

Compared with the prior art, in a method for manufacturing a composite sheet according to the present disclosure, with a second resin layer being removably disposed on a metal layer, the second resin layer can protect the metal layer during a hot-pressing step. Thereby, it is beneficial to maintain the gloss of the metal layer, so that the composite sheet with the metal layer and a composite structure with the composite sheet can provide much brighter visual effects along with varied decorated styles.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for manufacturing a composite sheet, comprising:

providing a film layer stack, wherein the film layer stack comprises a first resin layer, a metal layer and a second resin layer stacked in sequence, the metal layer is removably disposed on the first resin layer, and the second resin layer is removably disposed on the metal layer;

performing a first hot-pressing step, wherein the film layer stack is heated and pressurized to fix the metal layer on the first resin layer and maintain the second resin layer to be removably disposed on the metal layer;

removing the second resin layer and removably disposing a third resin layer on the metal layer to form another film layer stack;

stacking a release member on the another film layer stack, wherein a surface of the release member is formed with a plurality of concave portions, and the surface of the release member faces the third resin layer;

performing a second hot-pressing step, wherein the release member and the another film layer stack are heated and pressurized, so that the third resin layer is formed with a plurality of third resin protrusions corresponding to the plurality of concave portions, the metal layer is formed with a plurality of metal protrusions corresponding to the plurality of concave portions, and the first resin layer is formed with a plurality of first resin protrusions corresponding to the plurality of concave portions; and removing the release member.

* * * * *